US012637561B2

(12) United States Patent
Liao et al.

(10) Patent No.: US 12,637,561 B2
(45) Date of Patent: May 26, 2026

(54) COMPOSITION AND MANUFACTURING METHOD OF HIGHLY FLAME-RETARDANT AND LOW-SMOKE EXTRUDED POLYVINYL CHLORIDE PIPE

(71) Applicant: NAN YA PLASTICS CORPORATION, Taipei (TW)

(72) Inventors: Te-Chao Liao, Taipei (TW); Han-Ching Hsu, Taipei (TW); Chun-Lai Chen, Taipei (TW); Wen-Yi Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 747 days.

(21) Appl. No.: 18/071,568

(22) Filed: Nov. 29, 2022

(65) Prior Publication Data

US 2024/0117173 A1 Apr. 11, 2024

(30) Foreign Application Priority Data

Oct. 7, 2022 (TW) ................................. 111138157

(51) Int. Cl.
| | |
|---|---|
| *C08L 27/06* | (2006.01) |
| *B29C 48/00* | (2019.01) |
| *B29C 48/09* | (2019.01) |
| *B29C 48/793* | (2019.01) |
| *B29C 48/86* | (2019.01) |
| *B29C 48/88* | (2019.01) |
| *B29K 27/06* | (2006.01) |
| *C08K 5/00* | (2006.01) |

(52) U.S. Cl.
CPC ............ *C08L 27/06* (2013.01); *B29C 48/022* (2019.02); *B29C 48/09* (2019.02); *B29C 48/793* (2019.02); *B29C 48/865* (2019.02); *B29C 48/9115* (2019.02); *C08K 5/0066* (2013.01); *B29K 2027/06* (2013.01); *B29K 2995/0016* (2013.01); *C08L 2201/02* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,670,494 A | 6/1987 | Semenza, Jr. | |
| 5,891,571 A | 4/1999 | Herbert | |
| 2010/0292379 A1* | 11/2010 | Fung ........................ | C08K 3/22 |
| | | | 524/384 |
| 2014/0336321 A1 | 11/2014 | Yamasugi et al. | |

FOREIGN PATENT DOCUMENTS

| | | | | |
|---|---|---|---|---|
| CN | 101519518 A | 9/2009 | | |
| CN | 105566811 A | 5/2016 | | |
| CN | 107286540 A | 10/2017 | | |
| CN | 107778694 A | 3/2018 | | |
| CN | 108424588 A | 8/2018 | | |
| CN | 110594497 A | 12/2019 | | |
| CN | 112778671 A | 5/2021 | | |
| JP | 5920342 A | 2/1984 | | |
| JP | 4332747 A | 11/1992 | | |
| JP | 8157673 A | 6/1996 | | |
| JP | 2001192520 A | 7/2001 | | |
| JP | 2012/067257 | * | 4/2012 | |
| JP | 2019108437 A | 7/2019 | | |
| JP | 2020106060 A | 7/2020 | | |
| TW | I651352 B | 2/2019 | | |
| TW | 201908396 A | 3/2019 | | |
| WO | WO-2021076169 A1 * | 4/2021 | ........... | C08K 5/5333 |

OTHER PUBLICATIONS

Walsh Applied Plastics Engineering Handbook, Section 34: The Plastic Piping Industry in North America p. 585-602, 2011 (Year: 2011).*

* cited by examiner

*Primary Examiner* — Robert T Butcher
(74) *Attorney, Agent, or Firm* — Li & Cai Intellectual Property Office

(57) ABSTRACT

A composition and a manufacturing method of a highly flame-retardant and low-smoke extruded polyvinyl chloride pipe are provided. The composition includes a polyvinyl chloride resin material, a flame retardant additive and a carbon forming additive. The polyvinyl chloride resin material is in an amount between 10 PHR (parts per hundred resin) and 90 PHR. The flame retardant additive is in an amount between 0.5 PHR and 2.0 PHR, and is a phosphorus-containing flame retardant modified by a modifier. The carbon forming additive is in an amount between 0.2 PHR and 1.0 PHR. The carbon forming additive is at least one material selected from a group consisting of zinc chloride, zinc stearate, calcium stearate, zinc hydroxystannate, anhydrous zinc stannate, zinc phosphate and zirconium phosphate. A total added amount of the flame retardant additive and the carbon forming additive in the composition is not greater than 3 PHR.

7 Claims, No Drawings

COMPOSITION AND MANUFACTURING METHOD OF HIGHLY FLAME-RETARDANT AND LOW-SMOKE EXTRUDED POLYVINYL CHLORIDE PIPE

CROSS-REFERENCE TO RELATED PATENT APPLICATION

This application claims the benefit of priority to Taiwan Patent Application No. 111138157, filed on Oct. 7, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a composition of a pipe, and more particularly to a composition and a manufacturing method of a highly flame-retardant and low-smoke extruded polyvinyl chloride pipe.

BACKGROUND OF THE DISCLOSURE

Polyvinyl chloride (PVC) resin materials have advantages of excellent electrical insulation, excellent mechanical strength, and low costs, and thus are widely used in the fields of construction and electricity (e.g., in water pipe materials, wire pipelines, cupboard furniture, and wires and cables). Pure polyvinyl chloride has a high chlorine content (generally above 55%), so that its limiting oxygen index is up to above 45. Therefore, the pure polyvinyl chloride has a flame retardant property and can be used as a flame retardant material.

However, the polyvinyl chloride emits a huge amount of black smoke when burning. This not only blocks visibility during escape, but also decreases escape and survival rates since the black smoke contains hydrochloric acid and compounds having polyphenyl structures.

Pat. No. U.S. Pat. No. 4,670,494A (Applicant: Gary Chemical Corp.) proposes to blend flame retardant additives such as zinc borate, phosphate and brominated acid ester into the polyvinyl chloride resin material, so as to reduce the amount of smoke produced by the resin material when burning. *P. Carty* proposes in "Flame-retardancy and Smoke-suppression Studies on Ferrocene Derivatives in PVC" (Applied Organometallic Chemistry, Volume 10, Issue 2, March 1996, P.101-111) to blend flame retardant additives such as stannate, basic iron oxide and ammonium molybdate into the polyvinyl chloride resin material, so as to effectively suppress the amount of smoke produced by the resin material when burning.

Publication No. US20140336321A1 (Applicant: Sekisui Chemical Co., Ltd.) proposes to use a phosphorus compound and expanded graphite as flame retardant additives of the polyvinyl chloride resin material. Patent No. U.S. Pat. No. 5,891,571A (Applicant: Alcan International Limited) proposes to blend flame retardant additives such as ammonium octamolybdate, zinc stannate and antimony trioxide into the polyvinyl chloride resin material, so as to reduce the amount of smoke produced by the resin material when burning.

Patent No. TWI651352 (Applicant: Nan Ya Plastics Corporation) proposes to blend flame retardant additives such as poly[bis(phenoxy)phosphazene], zinc stearate and calcium stearate into the polyvinyl chloride resin material, so as to obtain a flame retardant plate having characteristics of high flame retardancy and low smoke emission.

However, with regard to flame retardant formulas proposed in the above-mentioned conventional technologies, there are disadvantages of high addition of the flame retardant additives and high costs. As a result, the polyvinyl chloride resin material cannot maintain its competitive edge of being low in cost. In addition, due to the high addition of the flame retardant additives, articles (e.g., pipes) that are molded therefrom can have problems including poor tensile strength, reduced impact strength, etc.

SUMMARY OF THE DISCLOSURE

In response to the above-referenced technical inadequacies, the present disclosure provides a composition and a manufacturing method of a highly flame-retardant and low-smoke extruded polyvinyl chloride pipe.

In one aspect, the present disclosure provides a composition of a highly flame-retardant and low-smoke extruded polyvinyl chloride pipe, which includes: a polyvinyl chloride resin material in an amount between 10 PHR (parts per hundred resin) and 90 PHR, a flame retardant additive in an amount between 0.5 PHR and 2.0 PHR, and a carbon forming additive in an amount between 0.2 PHR and 1.0 PHR. The flame retardant additive is a phosphorus-containing flame retardant modified by a modifier. The carbon forming additive is at least one material selected from a group consisting of zinc chloride, zinc stearate, calcium stearate, zinc hydroxystannate, anhydrous zinc stannate, zinc phosphate and zirconium phosphate. A total added amount of the flame retardant additive and the carbon forming additive in the composition is not greater than 3 PHR.

Preferably, the modifier is an inorganic modifier or an organic modifier, the inorganic modifier is at least one material selected from a group consisting of zinc oxide, zinc hypophosphite and magnesium hydroxide, and the organic modifier is alkyl phosphoric acid.

Preferably, the modifier performs modification on the phosphorus-containing flame retardant through covalent bonding.

Preferably, the flame retardant additive is a melamine phosphate flame retardant modified by the modifier.

Preferably, the amount of the flame retardant additive is between 10 times and 0.5 times the amount of the carbon forming additive.

Preferably, the composition further includes: a chlorinated polyvinyl chloride resin material. A first number-average degree of polymerization (DPn) of the polyvinyl chloride resin material is between 1,000 and 1,800, and a second number-average degree of polymerization of the chlorinated polyvinyl chloride resin material is between 800 and 1,350.

Preferably, the polyvinyl chloride resin material is a polyvinyl chloride resin having a high chlorine content, and the polyvinyl chloride resin material has a chlorine content of not less than 55%. The amount of the polyvinyl chloride resin material is between 9 times and 1/9 times an amount of the chlorinated polyvinyl chloride resin material.

Preferably, the composition further includes: a thermal stabilizer additive, a toughening additive, a slip agent and an antioxidant additive.

Preferably, a usage amount of the thermal stabilizer additive ranges between 1 PHR and 5 PHR, a usage amount of the toughening additive ranges between 1 PHR and 10 PHR, a usage amount of the slip agent ranges between 1 PHR and 3 PHR, and a usage amount of the antioxidant additive ranges between 0.1 PHR and 2 PHR.

In another aspect, the present disclosure provides a manufacturing method of a highly flame-retardant and low-smoke extruded polyvinyl chloride pipe. The manufacturing method includes: adding the above-mentioned composition into a hot mixer, and performing a mixing operation with high-speed stirring and at a heating temperature between 100° C. and 120° C., so as to form a first mixture; reducing a temperature of the first mixture to a cooling temperature between 35° C. and 50° C., and cooling the first mixture to form a second mixture; and feeding the second mixture into an extrusion molding machine, in which the second mixture is melted at a melting temperature between 170° C. and 200° C., and is then extruded, molded and cooled, so as to obtain the extruded polyvinyl chloride pipe.

Therefore, in the composition and the manufacturing method of the highly flame-retardant and low-smoke extruded polyvinyl chloride pipe provided by the present disclosure, by virtue of "a flame retardant additive being in an amount between 0.5 PHR and 2.0 PHR, in which the flame retardant additive is a phosphorus-containing flame retardant modified by a modifier," "a carbon forming additive being in an amount between 0.2 PHR and 1.0 PHR, in which the carbon forming additive is at least one material selected from a group consisting of zinc chloride, zinc stearate, calcium stearate, zinc hydroxystannate, anhydrous zinc stannate, zinc phosphate and zirconium phosphate," and "a total added amount of the flame retardant additive and the carbon forming additive in the composition being not greater than 3 PHR," the extruded polyvinyl chloride pipe has a low flame retardant amount, a high flame retardant property, and a low smoke emission. In addition, advantages of the extruded polyvinyl chloride pipe include being low in costs, having excellent mechanical properties, etc.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Composition of Extruded Polyvinyl Chloride Pipe

The present disclosure provides a composition of an extruded polyvinyl chloride pipe, which at least includes: a polyvinyl chloride (PVC) resin material, a flame retardant additive and a carbon forming additive.

The composition of the extruded polyvinyl chloride pipe is uniformly mixed by a hot mixer and/or a cold mixer, and then undergoes an extrusion process, so that the extruded polyvinyl chloride pipe is formed. Such an extruded pipe has a low flame retardant amount, a high flame retardant property, and a low smoke emission, thereby effectively solving problems existing in the conventional technologies.

One main technical feature of the embodiments of the present disclosure is that, by selecting material types of the flame retardant additive and the carbon forming additive, a potentiation effect can be obtained. Moreover, even when being added in a low amount, the flame retardant additive can be used in a burning process of the polyvinyl chloride resin material, and carbon formation can be accelerated, thereby achieving the technical effects of having a high flame retardant property and a low smoke emission.

In terms of material selection, the flame retardant additive is a phosphorus-containing flame retardant modified by a modifier. More specifically, the flame retardant additive is a melamine phosphate flame retardant modified by the modifier. Here, the modifier is an organic modifier or an organic modifier. The inorganic modifier is at least one material selected from a group consisting of zinc oxide, zinc hypophosphite and magnesium hydroxide. The organic modifier can be, for example, alkyl phosphoric acid. In addition, the modifier performs modification on the phosphorus-containing flame retardant through covalent bonding, but the present disclosure is not limited thereto. For example, the modifier may also perform modification on the phosphorus-containing flame retardant through blending.

The phosphorus-containing flame retardant is also referred to as a phosphorus-based flame retardant. In this embodiment, the phosphorus-containing flame retardant is described by taking the melamine phosphate flame retardant as an example, but the present disclosure is not limited thereto. For example, the phosphorus-containing flame retardant can also be at least one material selected from a group consisting of phosphonitrilic chloride trimer, poly(bis(phenoxy)phosphazene), magnesium ammonium phosphate and ammonium polyphosphate.

The carbon forming additive is at least one material selected from a group consisting of zinc chloride, zinc stearate, calcium stearate, zinc hydroxystannate, anhydrous zinc stannate, zinc phosphate and zirconium phosphate.

In terms of usage amount, a usage amount of the polyvinyl chloride resin material generally ranges between 90 PHR and 10 PHR, preferably ranges between 80 PHR and 20 PHR, and more preferably ranges between 70 PHR and 30 PHR. That is to say, in the composition of the extruded polyvinyl chloride pipe, the polyvinyl chloride resin material is the main matrix component.

A usage amount of the flame retardant additive generally ranges between 0.5 PHR and 2.0 PHR, preferably ranges between 0.7 PHR and 1.5 PHR, and more preferably ranges between 0.8 PHR and 1.2 PHR. In addition, a usage amount of the carbon forming additive generally ranges between 0.2 PHR and 1.0 PHR, preferably ranges between 0.3 PHR and 0.9 PHR, and more preferably ranges between 0.4 PHR and 0.8 PHR. However, the present disclosure is not limited thereto.

Further, a total added amount of the flame retardant additive and the carbon forming additive is generally not greater than 3 PHR (preferably between 2.5 PHR and 1 PHR, and more preferably between 2 PHR and 1.2 PHR). That is to say, each of the flame retardant additive and the carbon forming additive has a low added amount.

In terms of ratio range, a ratio range of the flame retardant additive to the carbon forming additive is generally between 10/1 and 1/2, preferably between 8/1 and 1/1, and more preferably between 7/1 and 2/1. That is to say, an amount of the flame retardant additive is generally between 10 times and 0.5 times (preferably between 8 times and 1 times, and more preferably between 7 times and 2 times) an amount of the carbon forming additive.

According to the above-mentioned configuration, since the modifier is a component (e.g., zinc oxide) capable of rapid carbon formation at a high temperature, the flame retardant additive not only has a flame retardant effect per se, but also possesses an effect of accelerating carbon formation through modification of the modifier. Therefore, the total added amount of the flame retardant additive and the carbon forming additive in the polyvinyl chloride resin material can be effectively reduced.

Further, in this embodiment, the composition of the extruded polyvinyl chloride pipe further includes: a chlorinated polyvinyl chloride (CPVC) resin material, a thermal stabilizer additive, a toughening additive, a slip agent and an antioxidant additive.

Another main technical feature of the embodiments of the present disclosure is to select the polyvinyl chloride (PVC) resin material and the chlorinated polyvinyl chloride (CPVC) resin material that have a high rigidity, to control a difference in degree of polymerization between these two resin materials, and to blend with the thermal stabilizer additive, the toughening additive, the slip agent and the antioxidant additive. Then, the composition undergoes the extrusion process in an extrusion molding machine, so as to obtain the extruded polyvinyl chloride pipe. According to the above-mentioned material formula, the extruded polyvinyl chloride pipes obtained by the embodiments of the present disclosure have the characteristics of low costs and excellent mechanical properties.

In one embodiment of the present disclosure, a first number-average degree of polymerization (DPn) of the polyvinyl chloride (PVC) resin material is generally between 1,000 and 1,800, preferably between 1,100 and 1,700, and more preferably between 1,200 and 1,500. In addition, a second number-average degree of polymerization (DPn) of the chlorinated polyvinyl chloride (CPVC) resin material is generally between 800 and 1,350, preferably between 900 and 1,300, and more preferably between 1,000 and 1,200. The first number-average degree of polymerization is generally 2 times to 1 times (preferably 1.3 times to 1.1 times) the second number-average degree of polymerization, but the present disclosure is not limited thereto.

In terms of usage amount, a usage amount of the chlorinated polyvinyl chloride (CPVC) resin material generally ranges between 10 PHR and 90 PHR, preferably ranges between 20 PHR and 80 PHR, and more preferably ranges between 30 PHR and 70 PHR.

In one embodiment of the present disclosure, the polyvinyl chloride (PVC) resin material is a polyvinyl chloride resin having a high chlorine content, and the polyvinyl chloride resin material has a chlorine content of not less than 55%. In addition, a total amount of the polyvinyl chloride (PVC) resin material and the chlorinated polyvinyl chloride (CPVC) resin material is 100 PHR, and an amount of the polyvinyl chloride (PVC) resin material is between 9 times and 1/9 times (preferably between 6 times and 1/5 times, and more preferably between 4 times and 1/2 times) an amount of the chlorinated polyvinyl chloride (CPVC) resin material. However, the present disclosure is not limited thereto.

A usage amount of the thermal stabilizer additive generally ranges between 1 PHR and 5 PHR, preferably ranges between 2 PHR and 4.5 PHR, and more preferably ranges between 2.5 PHR and 4 PHR.

The thermal stabilizer additive is used to improve the thermal stability of the resin material. A material type of the thermal stabilizer additive is at least one material selected from a group consisting of thiol ester-organostannane, a calcium zinc stabilizer and a hydrotalcite stabilizer.

A usage amount of the toughening additive generally ranges between 1 PHR and 10 PHR, preferably ranges between 2 PHR and 8 PHR, and more preferably ranges between 3 PHR and 7 PHR.

The toughening additive is used to improve the toughness of the resin material. A material type of the toughening additive is at least one material selected from a group consisting of chlorinated polyethylene (CPE), an acrylic (ACR) elastomer, a polyethylene-vinyl acetate (PEVA) elastomer, a methyl methacrylate-butadiene-styrene (MBS) elastomer, an acrylate-butadiene-styrene (ABS) elastomer, a styrene-butadiene-styrene (SBS) elastomer, a styrene-isoprene-styrene (SIS) elastomer, a styrene-ethylene/butene-styrene (SEBS) elastomer, a styrene-ethylene/propylene-styrene (SEPS) elastomer, an acrylate-butadiene rubber, a nitrile butadiene rubber (NBR), poly-methyl-methacrylate (PMMA), ethylene propylene diene monomer (EPDM), a thermoplastic polyurethane (TPU) elastomer, a thermoplastic polyolefin (TPO) elastomer, and a thermoplastic elastomer (TPE).

A usage amount of the slip agent generally ranges between 1 PHR and 3 PHR, preferably ranges between 1.2 PHR and 2.5 PHR, and more preferably ranges between 1.6 PHR and 2.4 PHR.

The slip agent is used to improve the compatibility of the resin material. A material type of the slip agent is at least one material selected from a group consisting of polyethylene wax, oxidized polyethylene wax, a fatty acid slip agent, a fatty acid amide slip agent, a metal soap slip agent and an organic silicon slip agent.

A usage amount of the antioxidant additive generally ranges between 0.1 PHR and 2 PHR, preferably ranges between 0.3 PHR and 1.8 PHR, and more preferably ranges between 0.5 PHR and 1.5 PHR.

The antioxidant additive is used to improve the oxidation resistance of the resin material. A material type of the antioxidant additive is at least one material selected from a group consisting of a hindered phenolic antioxidant and a phosphite-based antioxidant.

Manufacturing Method of Extruded Polyvinyl Chloride Pipe

The above description relates to the composition of the extruded polyvinyl chloride pipe according to the embodiments of the present disclosure. In the following paragraphs, a manufacturing method of the extruded polyvinyl chloride pipe will be illustrated according to the embodiments of the present disclosure.

The manufacturing method of the extruded polyvinyl chloride pipe provided in one embodiment of the present disclosure includes steps S110 to S130. It should be noted that a sequence and an actual operation of the steps described in this embodiment can be adjusted as necessary and are not limited to those described herein.

The step S110 includes: adding the composition of the extruded polyvinyl chloride pipe into the hot mixer, and performing a mixing operation with high-speed stirring between 500 RPM and 1,500 RPM and at a heating temperature between 100° C. and 120° C., so as to form a first mixture.

The step S120 includes: adding the first mixture into the cold mixer for further stirring, reducing a temperature of the first mixture to a cooling temperature between 35° C. and 50° C., and cooling the first mixture to form a second mixture.

The step S130 includes: feeding the second mixture into the extrusion molding machine, in which the second mixture is melted at a melting temperature between 170° C. and 200° C., and is then extruded, molded and cooled, so as to obtain the extruded polyvinyl chloride pipe. The extruded polyvinyl chloride pipe has a low flame retardant amount, a high flame retardant property, and a low smoke emission. In addition, advantages of the extruded polyvinyl chloride pipe include being low in costs, having excellent mechanical properties, etc.

Test for Experimental Data

Hereafter, a more detailed description will be provided with reference to Examples 1 to 4 and Comparative Examples 1 to 2. However, the following examples are provided only to aid in understanding of the present disclosure, and the scope of the present disclosure is not limited to these exemplary examples. Herein, the "parts" referred to in the components below means "parts per hundred resin (PHR)", and the actual unit used is gram, but the present disclosure is not limited thereto.

Example 1: A composition of an extruded polyvinyl chloride pipe includes 90 parts of a PVC resin, 10 parts of a CPVC resin, 2.5 parts of a thermal stabilizer, 5 parts of an ACR toughening agent, 5 parts of a modified melamine phosphate flame retardant, 1.5 parts of oxidized polyethylene wax and 0.5 parts of an antioxidant (I-1010). The above-mentioned components are prepared in parts by weight, and are put into a high-speed hot mixer for dispersion and stirring at a stirring temperature set to be 110° C. Then, the material is discharged into a cold mixer for stirring and cooling. After the temperature is reduced to 40° C., the material is discharged into a hopper and undergoes procedures such as extrusion, molding and cooling in a twin-screw extruder, so as to obtain the extruded polyvinyl chloride pipe. Temperatures of barrels of the twin-screw extruder are set to be 185° C. and 170° C., respectively. Further, molding temperatures are set to be 175° C. and 190° C., respectively.

Example 2: A composition of an extruded polyvinyl chloride pipe includes 90 parts of a PVC resin, 10 parts of a CPVC resin, 2.5 parts of a thermal stabilizer, 5 parts of an ACR toughening agent, 1 part of anhydrous zinc stannate (i.e., a carbon forming additive), 1.5 parts of oxidized polyethylene wax and 0.5 parts of an antioxidant (I-1010). The above-mentioned components are prepared in parts by weight, and are put into the high-speed hot mixer for dispersion and stirring at the stirring temperature set to be 110° C. Then, the material is discharged into the cold mixer for stirring and cooling. After the temperature is reduced to 40° C., the material is discharged into the hopper and undergoes procedures such as extrusion, molding and cooling in the twin-screw extruder, so as to obtain the extruded polyvinyl chloride pipe. The temperatures of the barrels of the twin-screw extruder are set to be 185° C. and 170° C., respectively. Further, the molding temperatures are set to be 175° C. and 190° C., respectively.

Example 3: A composition of an extruded polyvinyl chloride pipe includes 70 parts of a PVC resin, 30 parts of a CPVC resin, 2.5 parts of a thermal stabilizer, 5 parts of an ACR toughening agent, 1 part of a modified melamine phosphate flame retardant, 2 parts of anhydrous zinc stannate (i.e., a carbon forming additive), 1.5 parts of oxidized polyethylene wax and 0.5 parts of an antioxidant (I-1010). The above-mentioned components are prepared in parts by weight, and are put into the high-speed hot mixer for dispersion and stirring at the stirring temperature set to be 110° C. Then, the material is discharged into the cold mixer for stirring and cooling. After the temperature is reduced to 40° C., the material is discharged into the hopper and undergoes procedures such as extrusion, molding and cooling in the twin-screw extruder, so as to obtain the extruded polyvinyl chloride pipe. The temperatures of the barrels of the twin-screw extruder are set to be 185° C. and 170° C., respectively. Further, the molding temperatures are set to be 175° C. and 190° C., respectively.

Example 4: A composition of an extruded polyvinyl chloride pipe includes 70 parts of a PVC resin, 30 parts of a CPVC resin, 2.5 parts of a thermal stabilizer, 5 parts of an ACR toughening agent, 1 part of a modified melamine phosphate flame retardant, 0.5 parts of anhydrous zinc stannate (i.e., a carbon forming additive), 1.5 parts of oxidized polyethylene wax and 0.5 parts of an antioxidant (I-1010). The above-mentioned components are prepared in parts by weight, and are put into the high-speed hot mixer for dispersion and stirring at the stirring temperature set to be 110° C. Then, the material is discharged into the cold mixer for stirring and cooling. After the temperature is reduced to 40° C., the material is discharged into the hopper and undergoes procedures such as extrusion, molding and cooling in the twin-screw extruder, so as to obtain the extruded polyvinyl chloride pipe. The temperatures of the barrels of the twin-screw extruder are set to be 185° C. and 170° C., respectively. Further, the molding temperatures are set to be 175° C. and 190° C., respectively. Example 4 is the most exemplary embodiment of the present disclosure.

Comparative Example 1: A composition of an extruded polyvinyl chloride pipe includes 100 parts of a PVC resin, 2.5 parts of a thermal stabilizer, 1.5 parts of oxidized polyethylene wax and 0.5 parts of an antioxidant (I-1010). The above-mentioned components are prepared in parts by weight, and are put into the high-speed hot mixer for dispersion and stirring at the stirring temperature set to be 110° C. Then, the material is discharged into the cold mixer for stirring and cooling. After the temperature is reduced to 40° C., the material is discharged into the hopper and undergoes procedures such as extrusion, molding and cooling in the twin-screw extruder, so as to obtain the extruded polyvinyl chloride pipe. The temperatures of the barrels of the twin-screw extruder are set to be 185° C. and 170° C., respectively. Further, the molding temperatures are set to be 175° C. and 190° C., respectively.

Comparative Example 2: A composition of an extruded polyvinyl chloride pipe includes 70 parts of a PVC resin, 2.5 parts of a thermal stabilizer, 5 parts of an ACR toughening agent, 1.5 parts of oxidized polyethylene wax and 0.5 parts of an antioxidant (I-1010). The above-mentioned components are prepared in parts by weight, and are put into the high-speed hot mixer for dispersion and stirring at the stirring temperature set to be 110° C. Then, the material is discharged into the cold mixer for stirring and cooling. After the temperature is reduced to 40° C., the material is discharged into the hopper and undergoes procedures such as extrusion, molding and cooling in the twin-screw extruder, so as to obtain the extruded polyvinyl chloride pipe. The temperatures of the barrels of the twin-screw extruder are set to be 185° C. and 170° C., respectively. Further, the molding temperatures are set to be 175° C. and 190° C., respectively.

Here, manufacturing parameters and conditions of the components are listed in Table 1 below.

The extruded polyvinyl chloride pipes manufactured in Examples 1 to 4 and Comparative Examples 1 to 2 are tested for physical and chemical properties, so as to obtain the Flame retardant rating: A standard test method for surface burning characteristics of building materials is carried out according to the U.S. fire protection test standard ASTM E84, which can be divided into fire-protection Class A, fire-protection Class B and fire-protection Class C.

Flame spread index and smoke developed index: Flame spread refers to development of the flame on a surface of the material, and is related to fire expansion due to close proximity to combustibles in a fire. The flame spread property is often tested by a tunnel method and a radiant panel method. These methods are used for measuring a flame spread speed (and a smoke concentration) of the building material. A material with a smaller flame spread index (FSI) has a lower fire risk. Materials with FSI <25 should be used for tall buildings and corridors, materials with 25<FSI <100 can only be used for places without very strict fire protection requirements, and materials with FSI >100 do not meet the demand for flame retardancy.

Tensile strength: The tensile strength of plastics can be obtained by a tensile test on a plastic material according to the ASTM D638 standard.

Impact strength: A notched Izod impact (bending) test is performed according to the ASTM D256 standard, so that an impact strength and a characteristic value of notch sensitivity at a high strain rate can be generated in the form of a thickness-related energy value. The test is generally performed in a normal climate at 23° C. and at a relative humidity of 50%, so as to measure the impact strength and a notched impact strength of plastics.

TABLE 1

| | | [Experimental Conditions and Test Results] | | | | | |
| --- | --- | --- | --- | --- | --- | --- | --- |
| | Item | Example 1 | Example 2 | Example 3 | Example 4 | Comparative Example 1 | Comparative Example 2 |
| Composition of pipe | Polyvinyl chloride (PHR) | 90 | 90 | 70 | 70 | 100 | 100 |
| | Chlorinated polyvinyl chloride (PHR) | 10 | 10 | 30 | 30 | 0 | 0 |
| | Flame retardant additive (PHR) | 5 | — | 1 | 1 | 0 | 0 |
| | Carbon forming additive (PHR) | 0 | 1 | 2 | 0.5 | 0 | 0 |
| | Thermal stabilizer additive (PHR) | 2.5 | 2.5 | 2.5 | 2.5 | 2.5 | 2.5 |
| | Toughening additive (PHR) | 5 | 5 | 5 | 5 | 0 | 5 |
| | Slip agent (PHR) | 1.5 | 1.5 | 1.5 | 1.5 | 1.5 | 1.5 |
| | Antioxidant additive (PHR) | 0.5 | 0.5 | 0.5 | 0.5 | 0.5 | 0.5 |
| Physical and chemical properties | Flame retardant rating (ASTM E84) | Fire-protection Class C | Less than fire-protection Class C | Fire-protection Class B | Fire-protection Class A | Less than fire-protection Class C | Less than fire-protection Class C |
| | Flame spread index (FSI) | 83 | 288 | 28 | 5.7 | 350 | 374 |
| | Smoke density index (SDI) | 158 | 522 | 32.6 | 0.08 | 642 | 688 |
| | Tensile strength (MPa) | 51.5 | 52.6 | 52.3 | 52.5 | 49.2 | 52.9 |
| | Impact strength (J/m) | 51.0 | 54.7 | 54.5 | 54.7 | 17.6 | 54.9 | physical and chemical properties of these extruded polyvinyl chloride pipes (e.g., a flame retardant rating, a flame spread index, a smoke developed index, tensile strength and impact strength). Relevant test methods are described below, and relevant test results are listed in Table 1.

Discussion on Test Results

A comparison is made among Examples 1 to 4, Comparative Example 2, and Comparative Example 1. It can be observed that Comparative Example 1 (without addition of a toughening agent) has an obviously low impact strength, Example 1 shows a slight decrease in impact strength due to a high flame retardant amount (5 parts), and the impact strength of each of Examples 2 to 4 remains unchanged. Example 1 only reaches the fire-protection Class C when the modified melamine phosphate flame retardant alone is added. Example 2 shows a poor flame retardant effect when the carbon forming additive alone is added. Although the modified melamine phosphate flame retardant and the carbon forming additive are both added in Example 3, Example 3 only reaches the fire-protection Class B due to a poor carbon formation of the modified melamine phosphate flame retardant (which is caused by an excessive amount of the carbon forming additive). In Example 4, due to a proper ratio of the modified melamine phosphate flame retardant to the carbon forming additive, a better carbon formation of the modified melamine phosphate flame retardant can be achieved. Example 4 can reach the fire-protection Class A, and is thus the most exemplary embodiment of the present disclosure.

Beneficial Effects of the Embodiments

In conclusion, in the composition and the manufacturing method of the extruded polyvinyl chloride pipe provided by the present disclosure, by virtue of "a flame retardant additive being in an amount between 0.5 PHR and 2.0 PHR, in which the flame retardant additive is a phosphorus-containing flame retardant modified by a modifier," "a carbon forming additive being in an amount between 0.2 PHR and 1.0 PHR, in which the carbon forming additive is at least one material selected from a group consisting of zinc chloride, zinc stearate, calcium stearate, zinc hydroxystannate, anhydrous zinc stannate, zinc phosphate and zirconium phosphate," and "a total added amount of the flame retardant additive and the carbon forming additive in the composition being not greater than 3 PHR," the extruded polyvinyl chloride pipe has a low flame retardant amount, a high flame retardant property, and a low smoke emission. In addition, the advantages of the extruded polyvinyl chloride pipe include being low in costs, having excellent mechanical properties, etc.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A composition of a highly flame-retardant and low-smoke extruded polyvinyl chloride pipe, comprising:

a polyvinyl chloride resin material in an amount between 10 PHR (parts per hundred resin) and 90 PHR;

a flame retardant additive in an amount between 0.8 PHR and 1.2 PHR, wherein the flame retardant additive is a melamine phosphate flame retardant modified by a modifier, the modifier is alkyl phosphoric acid, and the alkyl phosphoric acid is covalently bonded to the melamine phosphate flame retardant; and a carbon forming additive in an amount between 0.4 PHR and 0.8 PHR, wherein the carbon forming additive is at least one material selected from a group consisting of zinc chloride, zinc stearate, calcium stearate, zinc hydroxystannate, anhydrous zinc stannate, zinc phosphate and zirconium phosphate; wherein a total added amount of the flame retardant additive and the carbon forming additive in the composition is between 1.2 PHR and 2.0 PHR.

2. The composition according to claim 1, wherein the amount of the flame retardant additive is between 2 times and 7 times the amount of the carbon forming additive.

3. The composition according to claim 1, further comprising: a chlorinated polyvinyl chloride resin material, wherein a first number-average degree of polymerization (DPn) of the polyvinyl chloride resin material is between 1,000 and 1,800, and a second number-average degree of polymerization of the chlorinated polyvinyl chloride resin material is between 800 and 1,350.

4. The composition according to claim 3, wherein the polyvinyl chloride resin material is a polyvinyl chloride resin having a high chlorine content, and the polyvinyl chloride resin material has a chlorine content of not less than 55%; wherein the amount of the polyvinyl chloride resin material is between 9 times and ⅑ times an amount of the chlorinated polyvinyl chloride resin material.

5. The composition according to claim 1, further comprising: a thermal stabilizer additive, a toughening additive, a slip agent and an antioxidant additive.

6. The composition according to claim 5, wherein a usage amount of the thermal stabilizer additive ranges between 1 PHR and 5 PHR, a usage amount of the toughening additive ranges between 1 PHR and 10 PHR, a usage amount of the slip agent ranges between 1 PHR and 3 PHR, and a usage amount of the antioxidant additive ranges between 0.1 PHR and 2 PHR.

7. A manufacturing method of a highly flame-retardant and low-smoke extruded polyvinyl chloride pipe, comprising:

adding the composition as claimed in claim 1 into a hot mixer, and performing a mixing operation with high-speed stirring and at a heating temperature between 100° C. and 120° C., so as to form a first mixture;

reducing a temperature of the first mixture to a cooling temperature between 35° C. and 50° C., and cooling the first mixture to form a second mixture; and feeding the second mixture into an extrusion molding machine, wherein the second mixture is melted at a melting temperature between 170° C. and 200° C., and is then extruded, molded and cooled, so as to obtain the extruded polyvinyl chloride pipe.

\* \* \* \* \*